Sept. 24, 1935.  F. V. ELBERTZ  2,015,069
WORM AND WORM WHEEL GEAR ASSEMBLY AND THE PRODUCTION THEREOF
Filed Jan. 10, 1933  4 Sheets-Sheet 4

Fig. 4.

INVENTOR
Frank V. Elbertz,
BY
ATTORNEYS

Patented Sept. 24, 1935

2,015,069

UNITED STATES PATENT OFFICE 2,015,069

WORM AND WORM WHEEL GEAR ASSEMBLY AND THE PRODUCTION THEREOF

Frank V. Elbertz, Lake Orion, Mich.

Application January 10, 1933, Serial No. 651,029

24 Claims. (Cl. 74—458)

This invention relates to improvements in worm and worm wheel gear assemblies and the production thereof.

Worm and gear assemblies have generally been of two types. In one of these types the worm has its thread diameter uniform throughout the length of the thread zone of the worm, thus giving the assembly somewhat of the characteristics of a rack and gear assembly. Since the relation of the worm and gear is thus a relation of tangency the number of teeth capable of concurrent work with the gear is necessarily limited so that the assembly, in service, is thereby limited to some extent in its available field of service. In addition, the tangency condition and the consequent difference in relation of successive threads to the gear teeth makes the structure especially liable to deterioration under the effect of backlash conditions, and such structures require frequent adjustment to compensate for the conditions of wear. Another disadvantage lies in the fact that the helical angle of the threads is constant, so that if it is desired to substitute one worm for another with the two worms differing as to the number of threads per unit of length of the worm—thus setting up a variance in the helical angle of the threads—the gear teeth which co-operate with the worms would not properly conform when the shift is made from one to the other of the worms, unless the assembly be prepared especially to meet the conditions; if the tangency arrangement be such that the working engagement is practically limited to a single tooth or thread, such substitution is possible, and such fact is utilized in some structures designed to provide a change speed relation by the use of worms of different pitch being employed on the same shaft but designed to be brought into co-operative relation with the gear individually. Other disadvantages are present in the production or development of the assembly in the use of the worm as a hob for the development of the gear, but these are not referred to in detail at this point.

The second type of assembly is generally known as the "hour-glass" type, due to the general shape of the worms in this type. In this type the thread zone conforms to the arc of the gear or worm wheel which may be in engagement with the worm at any time, the type thus setting up what is termed an enveloping condition, since there is a general conformation between worm and gear with the tooth engagement extending throughout the length of the thread zone, the latter being of advantage because of the fact that a number of threads are thus actively working in the drive action concurrently, thereby distributing the drive action rather than localizing it to a single thread. In this type the helical angle of the worm thread necessarily varies in the length progression of the worm since the pitch diameter of the worm necessarily varies due to the shape of the worm; to compensate for this variation in helical angle and retain the drive relation of the teeth, the wheel teeth are generated with an involute contour. However, in this type the line of action axis of the assembly must extend in a direction at direct right angles to the axis of the worm, due to the shape of the worm; the term "line of action axis" is used to designate the radius of the worm wheel which extends from the wheel axis to the point on the wheel periphery which is active with the worm midway of the length of the tooth engaged zone of the worm and gear, such zone being considered as the "action" zone of the assembly since it is the zone in which the drive action is taking place; in this type, the line of action axis thus coincides with the portion of the worm which has the least pitch diameter, since such portion provides the mid point of the action zone of the worm. As a result, the line of action axis must, in this type, extend at right angles to the worm axes.

One of the conditions brought about by the latter fact is the inability to substitute a worm having a different number of threads in the assembly without a corresponding change in the worm wheel of the assembly or a change in assembly wheel tooth generation, although the changed assembly may have similar distances between the worm and gear axes. The change in the number of threads of the worm effects changes in the helical angles at the different pitch diameters—including the angle at the line of action axis—so that the desired working action is not efficiently obtained where the assembly change involves only the substitution of the worm. As a result, the "hour glass" type is practically limited to service conditions in which the worm and its wheel are individually complemental as distinguished from complementally complemental such as would be essential, for instance, where the assembly is to be employed under service conditions where a change in speed ratio of worm and wheel is desired, with the assembly retaining similar distances between worm and wheel axes. Hence, the type is not applicable for use, for instance, under change speed conditions.

The type additionally has the disadvantages that under conditions of wear, the "action" zone or tooth engagement for drive action shifts until the zone is practically confined to the tooth or thread at an end of the worm—the portion of greater pitch diameter—thus progressively decreasing the drive distribution until the single tooth must take the entire drive load. To meet this condition—and in this respect a similar action has been employed with assemblies of the first type—it has been a practice in some cases to divide the worm at its center or point of least pitch diameter, removing a portion of the worm at such point to provide a space between the two end portions; the thread and tooth projection in such cases is arranged so that it is possible to thread up the two halves to decrease the space therebetween so as to restore the tooth engagement condition that had been lost through the conditions of wear; this arrangement thus tends to again shift the action zone of the assembly toward the line of action axis. But in each instance, the action zone extends on opposite sides of the line of action axis, and thus within the worm portions of larger pitch diameter. It is obvious that if the threading up action is to be possible the teeth and threads must be of a particular character—individual to the particular assembly—and that the length of threading advance is necessarily limited.

In other words, the hour glass type worm assemblies while having positive drive advantages, are necessarily limited to use under conditions where a single speed ratio, initially established, must be maintained throughout the life of the assembly. When a different speed ratio is to be employed, the changes required are such as to practically produce a changed assembly in which the worm and wheel are individually complemental—an assembly in which the wheel is collectively complemental to worms designed for different speed ratios is impracticable with this type.

From a comparison of the two types it is thus evident that each type has its advantages and disadvantages, the advantages of one being generally the disadvantage of the other, so that service conditions practically determine the type which may be employed under the particular service conditions with the type application more or less limited in the field of service to particular zones.

I have found that this condition of individual fields of service by worm and gear assemblies can be bridged and the individuality characteristic be eliminated to such an extent that a single distinctive type is applicable for use within all of the fields, so that the same type may be employed under conditions where a simple assembly of worm and wheel can have its worm substituted by a different worm to produce a different speed ratio, while retaining the initial wheel; two worms, differing as to number of threads may be employed concurrently with the same worm wheel, with one active and the other inactive as a drive element—thus enabling the production of change-speed conditions within a single assembly with the teeth engagement maintained throughout; produce a fairly constant line of action axis condition in the assembly under wear conditions when wear-take-up action is had by axial adjustment of the worm; reduce the length dimension of the worm while retaining the complete action zone; render the assembly collectively complemental rather than individual complemental, as well as providing other characteristic features, thus providing a worm and gear assembly type that is practically universal in its field of service.

This result is obtained by setting up a relationship between the worm and its wheel such as can be found in differential gearing. For instance, if a section through the worm and wheel assembly of the type disclosed herein be taken on a plane corresponding to a mid-plane section of the wheel and the section present the teeth characteristics of a spur and annular gear differential assembly—with the co-operating teeth properly arranged—the resulting assembly will set up conditions such as indicated. Since a differential assembly such as this bears a definite speed relation, the worm and wheel assembly can be given rather definite speed relation characteristics, whether the assembly actually presents the speed change possibilities provided by the use of separate worms present or substituted, with the characteristics based on the differential characteristic, the type disclosed herein can be considered as a differential type, distinguishing from both types previously discussed in this respect.

The use of the differential gearing of the spur and annular gear assembly type rather than the simple spur and internal annular gear assembly without the differential action, as the basis or foundation of the development of the worm and worm wheel assembly, can be readily understood from the conditions set up by these different forms of gearing in service. With the non-differential type, the line of axis of the assembly remains constant, so that the location of the point of tangency of the pitch circles is always the same. With the differential type, the tooth relation at the line of axis and immediate vicinity is the same, but as the relative rotation takes place the line of axis advances to carry this particular tooth relation successively around the assembly. It is this latter characteristic that becomes of importance in the present type of worm and worm wheel gearing, as will be understood from the following:

Assuming a worm and its wheel to be developed on the basis of the simple non-differential form, thus producing the tangency relation between the pitch circles of worm and wheel, by usual methods of cutting. The line of axis of the assembly being constant, the tooth and thread characteristics are such as to provide for proper operation with the cutting provided by a hob similar in characteristic to the worm which is to be used with the wheel. A worm of greater number of threads, although of the same pitch and radius of meridian curve, would not correctly operate therewith because of interference conditions, although a worm of a lesser number of threads could properly operate with the wheel. In neither case the contact would be of the completely enveloping type presented by the hour-glass type, but the line of action would be of sufficient length to provide a sufficient number of teeth in action.

An assembly such as this could be considered as having certain advantages over the normal hour glass type, for manufacturing reasons, as it would permit the production of worms in quantity and enable assembly of the similar worm structures with wheels differing in diameter but having the same general tooth pitch characteristics, thus permitting of initial speed selection through the change in wheel dimensions, this being possible through the fact that the line of axis is not changed by the substitution. Similarly, the substitution of worms indicated could permit of a limited substitution of worms. But in either substitution one fundamental condition is present—if the wheel dimension is the substitution, a difference in dimension as between the center lines of the two members of the assembly is necessary, since the smaller diameter wheel must provide contact and must therefore have a differently located axis—a condition which permits initial selection but prevents a substitution in a mechanism; and the same condition is present in the substitution of a worm of one number of threads for another—the change in the number of threads of the worm changes the worm diameter, with the result that the attempted substitution sets up the condition of changed dimensions between the center lines of the two members. As with the substitution of wheels of different dimension initially, the substitution of worms within the limits indicated can be provided initially, but when the mechanism has been established, substitution of worms would require re-location of centers in the mechanism, a fact which provides a deterrent against change.

It is to meet this general condition that the differential type of spur and internal gear assembly is utilized as the foundation of the present invention. As pointed out, the line of axis is shiftable as the assembly is operated, so that, in the developed assembly any desired independent lines of axis can be made the basis for individual points of tangency for each worm, with the result that the variations in worm diameter can be readily met by locating the point of tangency at such point as will place each of the worms on a common axis, and thus preserve the distance dimensions between the center lines of wheel and worm regardless of the number of different worms which may be utilized.

As will be understood, an assembly of this differential type will present the pitch lines of the worm and wheel as in tangential relation, thus having this characteristic of the first or uniform diameter type referred to, the tangent angle relation, however, being relatively small as compared with the former type; and since the tangential relation is in the form of curves instead of a curve and straight lines, the differential assembly presents the characteristics of the hour glass type in that the worm is of enveloping worm type with a plurality of threads active as drive elements to distribute the drive load as in the hour glass type.

The above indicates somewhat the functional and result distinctions which the differential type presents with respect to the two types generally employed. In addition to these, however, the differential type presents a number of structural advantages which permit of greater accuracy in production, lower cost of manufacture, and greater serviceability in use.

To these and other ends, therefore, the nature of which will be more clearly understood as the invention is hereinafter disclosed, the invention consists in the improved constructions and combinations of parts and the production of the assembly, as hereinafter fully disclosed, illustrated in the accompanying drawings, and more particularly pointed out in the appended claims.

In the accompanying drawings, in which similar reference characters indicate similar parts in each of the views;

Figure 2 is a similar view but with the thread zone of the worm having different number of threads per unit of length, the remaining structures being similar; Figs. 1 and 2 thus presenting conditions which illustrate the ability to substitute one worm with another to change the speed ratio relative to the same wheel.

For the purpose of illustrating the invention characteristics and the production of the assembly parts, the drawings include diagrammatic representations of the spur and annular gear differential assembly, these, in the drawings, indicating the spur gear as having 40 teeth, while the annular gear is formed with 48 teeth, thus presenting a differential characteristic therebetween. For the purpose of the illustration, this differential relation is considered as constant in each of the views, the spur gear being indicated at $a$, with its pitch circle indicated at $a'$ while the annular gear is indicated at $b$ with its pitch circle at $b'$. In the drawings, the axis of the gear $a$ remains constant, as does the axis of the worm, the distance between the worm and the gear axes thus remaining constant. And in the showing of worm and wheel, the axis of the wheel is considered as being the axis of gear $a$, the showing thus practically presenting the gear $a$ as illustrating both the gear and wheel.

As heretofore indicated, the wheel of the worm and wheel assembly is designed to present the characteristics of the tooth zone of the spur gear $a$, while the worm is designed to present the characteristics of the tooth zone of the annular gear $b$. Consequently, the pitch circle $a'$ is considered as the pitch circle of the worm wheel while the thread pitch line of the worm is indicated at $b'$, the tooth pitch circle of the annular gear, the thread pitch line being a segment of the tooth pitch line $b'$.

Figure 1:
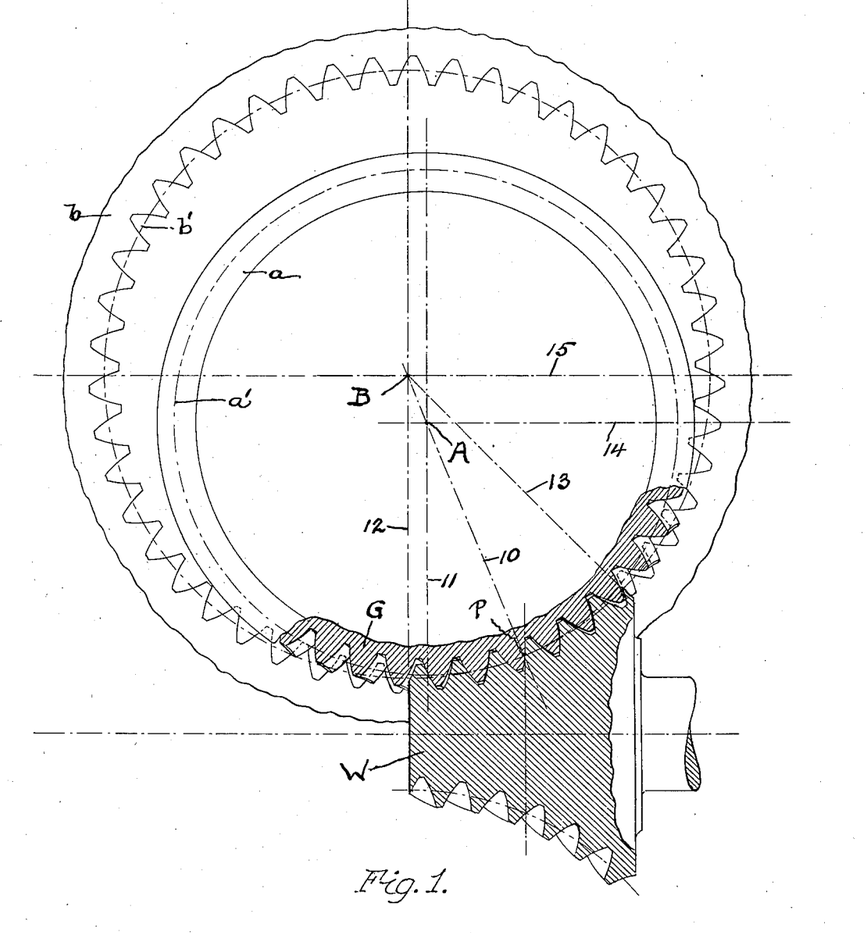
Figure 1 is a view, diagrammatic in nature, indicating the relationship of a worm and gear assembly of this differential type, the view including features which indicate the differential characteristics of the type when the worm of the assembly has its thread zone carrying one number of threads.
Figure 2:
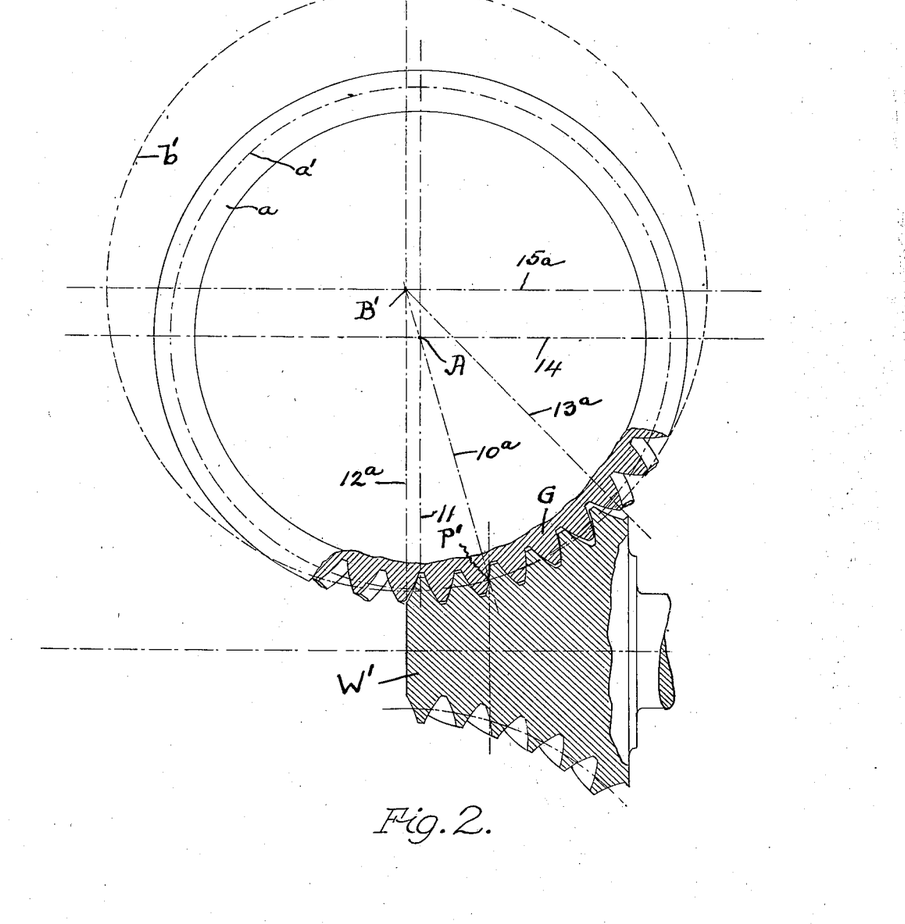
Figure 4:
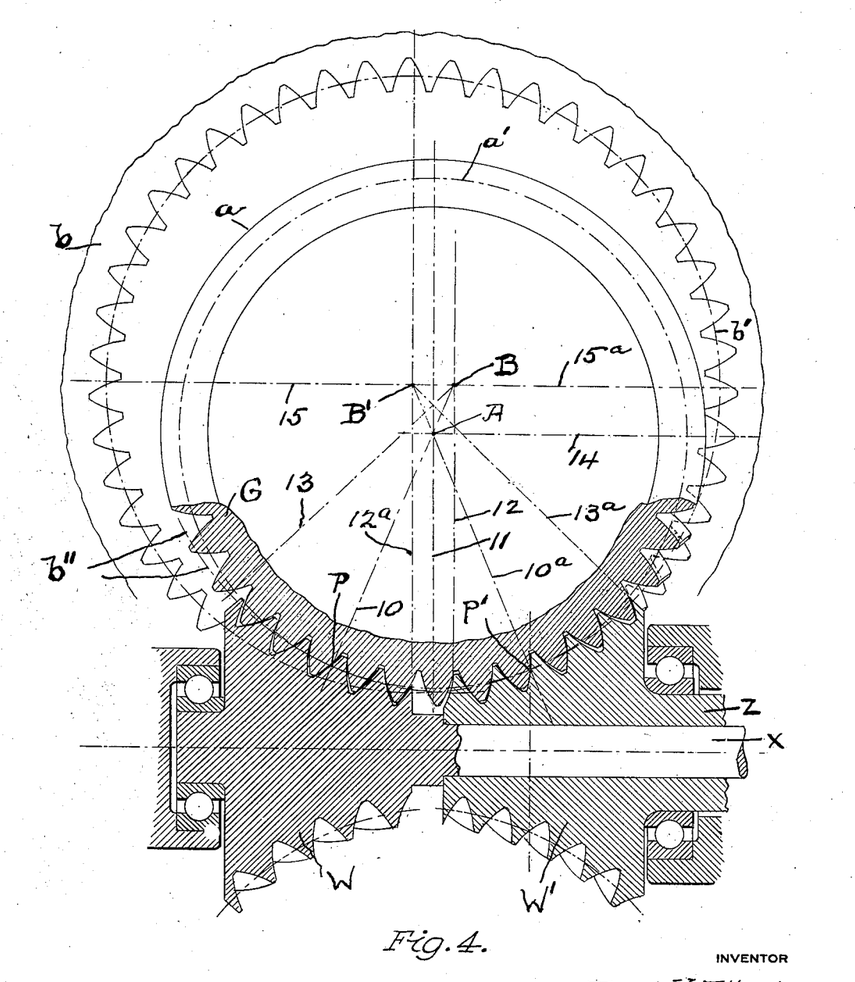
Figure 4 is a view, diagrammatic in nature, indicating the relationship of an assembly of this differential type, with the worms of Figs. 1 and 2 in position to actively co-operate with the single wormwheel, the arrangement, in service, having a drive relation between either worm individually and the worm wheel while the other worm idles.

For illustrative purposes the worm is also shown as located at one side of the usual line of action axis of assemblies of the hour glass type, thus indicating some of the flexibilities of the type, as well as indicating the possibilities for change speed purposes, since (as indicated in Fig. 4) it is obvious that a second worm can be located on the opposite side of such line with an axis co-incident with that of the worm shown in either Fig. 1 or Fig. 2. The worm illustrated has its thread zone length equal to approximately 45° of the annular gear pitch circle $b'$, thus practically shortening the length of the usual hour-glass type of worm to approximately half its length, such latter length being sufficient to provide the complete driving action activity with the differential type of assembly.

In developing the coacting faces of the assembly the various conditions above indicated are utilized, the following illustrating briefly some of the essential features:

Referring to Figure 1, the worm W is assumed to be of a nine-thread characteristic. Since the worm is located at one side of the vertical line, it has its ends differing as to diameter, with the end of least diameter at such vertical radius. As a result, a thread zone fashioned thereon will produce a progressive development in which the helical angle decreases away from the vertical radius line. Since the reduced-length worm is to be complete in itself, it is desirable that the "action zone" of the worm be located intermediate the ends of the thread zone and include a plurality of threads.

To produce the latter effect, the designer determines upon the helical angle of the worm which offers the greatest driving and coasting operation possibilities for the particular service desired, and from such point on the wheel pitch circle, connects this point with the axis of the worm wheel, continuing such radius—indicated as 10—a suitable distance beyond the axis. Radius 10 then becomes the line of action axis of the assembly, and the axis of the pitch circle $b'$ is rotated about the axis of pitch circle $a'$ until the axis of circle $b'$ is located on the extension of such line of action axis radius 10; the point of tangency of the two pitch circles is then located at the outer end of radius 10, such point becoming the center of the action zone of the worm. Since the thread pitch line of the worm thus becomes tangent to the pitch circle of the wheel, with the tangency angle relatively small, it can be understood that one or more threads on opposite sides of the line of action axis will closely approach the thread characteristics at such point, with the result that the action zone of the assembly will include a plurality of threads, each of which is active as a driving thread in the operation of the assembly. However, the increase of tangency angle beyond the action zone tends to carry the threads out of direct drive relationship, so that the worm, presents generally, the characteristic that the drive action zone is intermediate and spaced from the ends of the thread zone, although such condition is not absolutely essential, and it is possible that in some cases, the action zone may extend to an end—especially the end of lesser pitch diameter—of the worm, but it is preferable that it be spaced from the end by the location of the line of action axis at such point as to produce this result.

The location of the worm to one side of a vertical radius of the wheel is not, however, imperative. For instance, the line of action axis 10 can be located to correspond with such vertical radius, in which case the worm would appear as symmetrical with respect to such axis and take on a seeming appearance of the hour-glass worm because of this condition. However, in such form, the same differential characteristics presented in Fig. 1, for instance, will be present, the distinction being that in the rotation of the center of annular gear $b$ around the axis of gear $a$ the extension of the line of action axis through the center of $b$ will be simply a continuation of the vertical radius of a gear $a$, thus preserving the tangency relation between the tooth pitch circles $a'$ and $b'$, and thus present the tangent characteristic of the tooth pitch circle of the worm wheel and the tooth pitch line of the worm that is indicated in Fig. 1. In other words, the point of tangency is shifted from the point shown in Fig. 1 to a vertical radius of the worm wheel, and the worm structure arranged relative thereto so as to set up the conditions of the intermediate action zone spaced from the ends of the thread zone, as in Fig. 1. The shape of the worm is changed to an appearance of an hour glass, but the actual worm formation differs from that of the hour glass type in that the worm tooth pitch line is tangent to the tooth pitch line of the worm wheel instead of coincident therewith, the latter being the dominating feature of the known hour glass type of worm and gear assemblies. In such arrangement the hour-glass appearance would be present but the structure and operation differs fundamentally from that of the standard hour-glass type of such assemblies through the distinction provided by the contrasting tooth pitch circle characteristics—one presenting these as co-incident the other presenting them as tangential.

The change thus referred to is illustrative of the flexibility of the differential type disclosed herein. Because of the tangency relation of the two tooth pitch circles, the point of tangency can be shifted to any desired location along the tooth pitch circle of the wheel, just as the point of tangency of spur gear $a$ shifts relative to annular gear $b$ as the two gears are moved in the operation of the differential gearing assembly. And when shifted, the similarity in tangency relation ensures that the action will be similar. It is this characteristic that distinguishes the present type from the standard hour glass type, since the latter requires that the line of action axis always extend at right angles to the axis of the worm; as indicated in Fig. 1, the line of action axis extends angular to a line perpendicular to the worm axis, a condition impossible with the standard hour glass type of worm and gear assemblies.

Like the standard hour glass type, the worm has the tooth enveloping characteristic which enables a plurality of teeth to be active as driving teeth, but the envelopment is less complete than is present with the standard hour glass type, due to the fact that coincidence in the present is actually present only at the point of tangency; but the degree of tangency is so small that a considerable distance from the point of tangency along the tooth pitch circle of the worm wheel must be reached before the co-acting teeth of worm and wheel pass out of driving relation, so that the results produced by the enveloping condition present in the standard hour glass type, are presented in the type herein disclosed, even though the envelopment is not as complete, although sufficient to provide the desired result.

In this latter characteristic, the present type also is flexible as can be understood from the fact that the relation of the number of teeth in spur gear $a$ and annular gear $b$ can be varied to any extent, as in that type of differential assemblies. For instance, the difference in number of teeth of the two gears may be reduced to a single tooth. In such case, the tangency between the tooth pitch circles of the two gears becomes very small. If the worm and wheel assembly be produced under the teachings of the present type under this one tooth variation condition, the enveloping characteristic will be practically similar to that of the hour glass type, since the tangency within the thread zone would be insufficient to render any of the threads inactive as drivers, unless the line of action axis be located to produce this effect at one of the ends of the worm.

From this it can be understood that the type is sufficiently flexible as to permit the designer of the assembly to selectively determine the number of teeth he wishes to be active concurrently in the driving relation of the assembly, by utilizing the possibilities of the variations in number of teeth of the gears $a$ and $b$. As long as the number varies in the two gears—the condition of the differential assembly—the tangency characteristic of the tooth pitch circles will be present, thus setting up the tangency relation that forms a fundamental of the present type, the degree of tangency being one of the controlling factors in determining the number of teeth of the worm wheel which may be concurrently active with the worm threads in the drive action of the assembly.

The flexibility of the present type is further illustrated by the disclosure in Fig. 2 in which the worm wheel is presumed to be the wheel of Fig. 1, while the worm is of the eight-thread form instead of the nine threads present in the worm of Fig. 1. The distance between the axes of worm and wheel is the same in both cases, and the tooth pitch circles $a'$ and $b'$ are of the same dimensions in both figures, the same differential relation being employed.

For reasons presently pointed out, the 8-thread worm can be substituted for the 9-thread worm—both being prepared with similar blanks—but when applied to the worm wheel the helical angle at the point of tangency of Fig. 1 will differ from that present at that point with the 9-thread worm; since the speed ratio is increased by the substitution, that change is made manifest at the point of tangency by the change in helical angle. Hence, where the desire is to obtain the changed ratio through the combined result of the reduction in threads and the resultant change in helical angle, such substitution of the 8-thread worm for the 9-thread worm (both being cut from similar blanks) will be sufficient.

If, however, the desire be to retain the same helical angle at the point of tangency as was present with the 9-thread worm, the point of tangency itself must be shifted from the position of Fig. 1. And since such helical angle would be found on that part of the worm which is of less pitch diameter, the point of tangency must be shifted in such direction as to reduce the angle between the line of action axis of Fig. 1 and the vertical radius, a shift made possible through the flexibility of the type as heretofore pointed out. Such shift, however, produces certain conditions as made manifest in Fig. 3, in which the showing in Figs. 1 and 2 are presented in superposed relation, the worm however, being the 9-thread worm of Fig. 1.

As heretofore pointed out, the axis of annular gear $b$ is as shown located on an extension of the line of action axis which passes through the axis of gear $a$. Hence, when the need for shifting the point of tangency toward a zone of lesser pitch diameter of the worm, such shift would be equivalent to moving the line of action axis clockwise, in Fig. 1, and moving the extension of such line in the same direction. The latter movement would rotate the axis of gear $b$ around the axis of gear $a$ in a direction to increase the distance between the axis of gear $b$ and the axis of the worm, although the distance between the axes of gear $a$ and the worm remains constant. As a result, the tooth pitch line of the worm—which, in the present type, is to coincide with a segment of the pitch circle $b$—would not be coincident with the previous tooth pitch line shown in Fig. 1, and thus affect the tooth engagement of worm and wheel within the action zone, since the threads to the left of the point of tangency would not enter the tooth zone of the worm as great a distance as before. Hence, the smaller end of the worm is enlarged sufficiently to restore the former relation of the worm threads to the tooth pitch line of the worm, and thus set up the action zone formerly presented, but shifted clockwise because of the shift in the point of tangency in this direction. As the helical angle will then be the same as before at the point of tangency and the angle of tangency between the tooth pitch circles be as before, the tooth engagement within the action zone will be similar in the two cases; and on the mid-plane section of the wheel, with the section carried through the worm as a continuation of such plane, the assembly would present the characteristics of the gears $a$ and $b$ within the enveloping worm.

From this it can be understood that the type provides for such flexibility as is needed in meeting the needs of a general service use, and at the same time present the advantage of the extended action zone with a plurality of worm threads active concurrently in the driving relation. One or two worms may be employed individually in the same assembly setting and with the same worm wheel, enabling a substitution of one worm for another to vary the speed ratio between the worm and wheel within that setting (as indicated by a comparison of Figs. 1 and 2) or two worms, differing as to the number of threads present and therefore capable of producing a differential ratio relation within the assembly, can be permanently in tooth engagement with the worm wheel (as indicated in Fig. 4) and, by the use of suitable clutch mechanism arranged to render one of the worms to idle when the other worm is active as a drive—the idle worm being driven by the wheel as an idler—and thus provide characteristics of a change speed mechanism.

For the purpose of readily noting the changes set up, the following reference characters are employed:

In Fig. 1: The axis of gear $a$ is indicated at A; B indicates the axis of gear $b$; 11 indicates the vertical radius of gear $a$ and 12 the similar radius of gear $b$; 13 indicates the radius of the outer end of the thread zone; 14 is a line parallel to the worm axis to indicate the distance between the worm and worm wheel axes and 15 a similar line to indicate the distance between the axes of the worm and gear $b$. The worm is indicated at W, and a segment of the worm wheel at G. The point of tangency is indicated at P.

In Fig. 2: The axis of gear $a$ is indicated at A, this axis remaining constant; B' indicates the axis of gear $b$; $10a$ indicates the line of action axis, and P' the point of tangency; 11 indicates the vertical radius of gear $a$, this radius remaining constant in position, and $12a$ the similar radius of gear $b$; $13a$ indicates the radius of the outer end of the thread zone; 14 is the distance indicating line between the axes of worm and gear $a$, and $15a$ the distance—indicating line between the axes of worm and gear $b$. The worm is indicated at W' and a segment of the worm wheel at G, the latter remaining as before.

The reference characters of similar features in the two figures are the same when no change in location is had in Fig. 2; where the change is present from the locations of Fig. 1, the reference character has the added exponent. This use of reference characters is presented to permit Fig. 3 to accurately indicate the character of the changes made, Fig. 3, however, showing the worm W of Fig. 1, this worm being considered as being of the 9-thread type, while worm W' is of the 8-thread type. The worms are presumed to have the same pitch characteristics in connection with their threads. The showing of the dotted line representation below the worm in Fig. 3 has no special significance, simply presenting some of the development features above indicated as applied to the opposite side of the worm.

Figure 3:
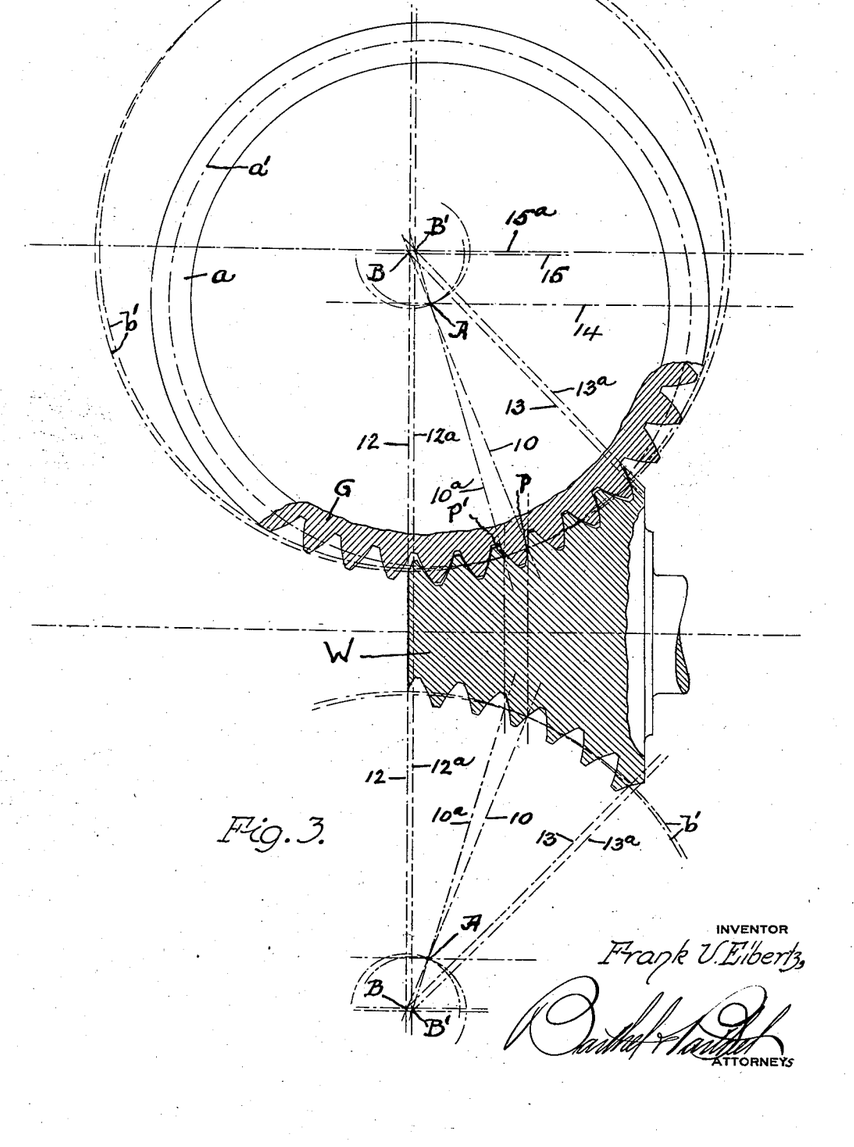
Figure 3 is a view of combining the showings of Figs. 1 and 2 with the exception of the worm, the latter being shown as of the type of Fig. 1, the view additionally presenting the similar development characteristics of the opposite side of the worm.

It will be understood, of course, that the positions of the indicated changes of Fig. 3 are due to the fact that the worm substitution is on the same side of the vertical radius. Where the assembly involves the concurrent use of two worms differing as to the number of threads, they would be located on opposite sides of the vertical radius. In such cases, assuming, for instance, that worm W is in the position shown in Fig. 1 and worm W' be positioned on the opposite side of the vertical radius, it will be understood that in shifting the point of tangency to meet the conditions discussed heretofore in connection with the development of Fig. 2, the axis B will be rotated about axis B to the opposite side of the vertical diameter of the gear $a$ from the position of axis B' in Fig. 2, since the line of action axis $10a$ will be located on the opposite side of the vertical radius.

Figure 4 illustrates diagrammatically an assemblage of the latter form in which two worms are in concurrent operative engagement with the worm wheel, the two worms, indicated as W and W' corresponding in their characteristics to the similar worms of Figs. 1 and 2, worm W having 9 threads, while worm W' is formed with 8 threads. The two worms are axially alined, with the shaft $x$ of worm W' indicated as a solid shaft, while the worm W carries an annular shaft $z$ through which shaft $x$ extends. In other words, aside from the end bearings, the worms have coaxial shafts extending in the same direction. By connecting these shafts to a common power source by a clutch mechanism capable of connecting either shaft to such source individually while the other shaft idles, the conditions of a change speed mechanism can be readily produced as previously indicated; because of the difference in number of threads both worms would not be adapted to concurrently act as drivers for the assembly, unless the shafts themselves were so connected, as by a differential mechanism between them, as to produce an actual drive relation between the worms and worm wheel of a speed ratio different from that of the worms individually, somewhat similarly to the conditions of the usual differential installations between driven mechanisms. For the purpose of the present disclosure—which relates to the worm and worm wheel, the particular form of the power source drive connections with the worms is immaterial, it being assumed, for the explanation that when one worm is active as the driver, the other is idling, assuming that the drive is from worm to worm wheel; since the connections so permit, the worm-wheel can serve as the driver and the worm serve as the driven element.

Fig. 4, as with the remaining views, is completed by the gears $a$ and $b$, and the remaining designating characteristics of Figs. 1 and 2 are presented by similar reference characters. The figure, however, is not wholly complete, due to the fact that, as previously explained, the shifting of the point of tangency from the position of W to that of W' would, in connection with gear $b$, require that an additional showing of gear $b$ be superposed with its axis at point B'—the present showing having this axis at B—and this would tend to confuse the showing. To permit the effect to be apparent, however, a segment of the pitch-line of gear $b$ when the latter is shifted to the axis position B', is indicated at $b''$ in connection with worm W', thus enabling the distinction of the tangential relation of the two enveloped pitch lines of gears $a$ and $b$ to be readily compared. The position of gear $a$ is the same for both worms, the shift being in gear $b$.

As will be understood, at the points of tangency—P and P'—the tooth and thread characteristics between worm and worm wheel are the same with both worms, but as the worm thread zones of the two worms are compared in directions from these points it will be noted that distinctions in the relationship of thread and tooth are varied at equal distances from the axis of tangency lines $10$ and $10a$, although the relation of the pitch lines at the points of tangency is the same with both worms. In practice, the two worms have the same helical angle at the point of tangency, the variations in the helical angles of the remainder of the respective worms, brought about by the difference in the number of threads, becoming manifest in the worm in directions away from the point of tangency. The maximum driving relation and efficiency is thus presented at the point of tangency, gradually decreasing away from the point of tangency, but at such slow rate that, in the worms disclosed, the driving contact is maintained throughout a zone which includes a plurality of teeth or threads, as previously described. The points of tangency, etc., shown are simply illustrative, since they are selected by the designer to meet the particular conditions of an installation, through selection of a desired helical angle condition at such point of tangency.

The above explanation relates more particularly to the preliminary development of the assembly. This will be understood from the fact that in the actual assembly neither of the gears $a$ and $b$ are actually present as such. The gear $a$ characteristics are found in the worm wheel and the characteristics of gear $b$ are found in the worm, these two elements in the assembly presenting the tangency relation that is present in the assembly of gears $a$ and $b$. In the succeeding action of producing these characteristics on the worm and worm wheel blanks certain manufacturing methods are employed, these not being specifically set forth herein since they form the subjects-matter of companion applications. These involve the production of the teeth of the worm wheel and the threads of the worm, and, for the purpose of the present application, may be considered as along orthodox lines used in the production of the worms and wheels of worm and gear assemblies. In such production, however, the characteristics above pointed out are provided so that the completed worm and worm wheel will, when assembled, produce the relations and activities pointed out.

It will be understood, of course, that in the development work above described, the relations referred to relate more particularly to the characteristics present at the mid-plane of the worm-wheel which, when continued extends through the axis of the worm. Obviously, the width of the wheel necessarily brings in the relation of the actual teeth of the worm wheel and the complete thread zone of the wheel, with these formed to provide the proper operative activity therebetween in service. These develop from the production of the worm and worm wheel, and are not detailed herein. However, it is desirable to refer to a few features which may be considered in this respect.

The threads of the worm and the teeth of the worm wheel preferably have their profiles and contours of involute form. This form permits of proper operation without interference, when either of the worms referred to are employed. When this form is employed, a section of the assembly on the mid-plane of the worm wheel will present the characteristics of the tooth engaging zone of the spur and annular gear formation shown in Fig. 1.

While the drawings and the above description indicate the use of 8-thread and 9-thread worms, the type is not limited to this close relation of speed ratios. For instance, if desired, a 10-thread or a 6-thread worm may be employed with the same wheel, as well as the intervening thread numbers. Where such a wide divergence of speed ratio is employed, however, the action zone is of decreased length—possibly two teeth—the change in this respect being brought about by increasing the number of teeth in gear $b$ relative to the number in gear $a$ and thus increasing the angle of tangency between the tooth pitch circles. This condition presents an additional evidence of the flexibility of the type, since it enables the selection of a desired length of action zone by varying the tooth ratio of the gears $a$ and $b$ and thereby varying the angle of tangency of the respective tooth pitch circles.

The ability to substitute worms or to utilize a plurality of worms within the teaching of the present invention is indicated somewhat by the diagrammatic disclosure of Figure 3 in which the directional characteristics of the two conditions of Figs. 1 and 2 are combinedly shown in proper relation, although shown with but one of the worms in position. In this view, the dotted line 10 indicates the line of axis and P the point of tangency of the 9-thread worm shown, the line 10a and point P' indicating, respectively, the line of axis and point of tangency of the 8-thread worm of Fig. 2. Because the generation of the parts has been on the basis of the differential type of gear assembly, it can be readily understood that the revolution of the line of axis 10a including point A about the axis B can be continued until it reaches a position where its angularity to line 12 is the same as shown but on the opposite side of line 12, thus shifting the point of tangency to the opposite side of the vertical line of axis 12, thus placing the 9-thread worm to the right of the vertical line of axis, as in Fig. 3, with the 8-thread worm positioned on the left side of the vertical axis in said figure, these positions permitting both worms to be physically present with alined axes, due to the fact that each occupies but one side of the space below the wheel in said figure; it is, of course, obvious, that if the 8-thread worm can be substituted for the 9-thread worm shown, it can be shifted to the opposite side of the vertical axis and operate with equal effect, in which case the 9-thread worm need not be removed, and both remain operative with the worm wheel, although but one of them is active operatively with the wheel, the other simply idling.

This is made possible through the fact that, as indicated, the point of tangency and line of axis has been shifted relative to the vertical axis in making the substitution indicated in Fig. 3, thus following the conditions of the differential type in which the line of axis shifts as the spur gear progresses. The particular point to which the line of axis is to be shifted can be readily determined mathematically, for accuracy, but can be readily explained briefly to enable a general understanding to be had:

The helical angle of a worm of the type shown—one in which the meridian is circular with the meridian radius equal to a radius of the annular internal toothed gear of the differential—generally varies with the diameter of the worm, growing less as the diameter increases. If, then, the worm be properly fashioned on the basis of the largest number of worm teeth to be employed in the assembly, and this worm then be transformed into a hob to cut the worm wheel with a proper generating structure operating on the differential assembly basis, the wheel will have its tooth characteristics such as to be operative with a worm which is a duplicate of that originally prepared and used as the hob. In fashioning the wheel with the largest thread number hob, the wheel teeth have taken shapes which no longer offer interference with the threads of a worm having a lesser number of teeth, as pointed out heretofore with respect to the simple type of gearing. The worm of lesser number of teeth, however, is of generally smaller diameter, so that although the same meridian circle characteristic, the same thread profile and the same helical angle conditions be present, the difference in worm diameter will necessarily shift the position of the helical angle that is active at the point of tangency of the larger thread-number worm relative to the end of the worm. Since the line of axis and point of tangency of both worms are presumed to operate at the same helical angle, it becomes evident that, to preserve the axial alinement, that the line of axis and point of tangency must be shifted to a position on the worm where the helical angle equals that at which the other worm is operating. This is illustrated in Fig. 3 by the position of point of tangency P' which lies closer to the smaller end of the worm than the position of the point P with respect to the 9-thread worm, the point P on the 8-thread worm presenting a helical angle differing from that of the 9-thread worm. Therefore, by knowing the diameter of a lesser-thread number worm at which the helical angle is equal to that of the active helical angle of the largest worm, the lesser-thread number worm is positioned on the worm axis so that its line of axis coincides with a point of tangency of the wormwheel, in which position the worm will operate properly with the wheel although the teeth of the latter were generated with the hob of larger thread number. With each worm fashioned and located in this manner, it becomes necessary only to ascertain the points of equal helical angle and locate the worm in proper relation to the point of tangency individual to itself, to permit all of the worms to properly articulate with the wheel individually or collectively.

It will be understood, of course, that whether the foundation of the assembly rests upon the simple form of spur and annular internal gear structure or the differential form, the tangency relation between the pitch circles will be present, due to the use of the spur and annular internal gear form of gear, the two gears having teeth differing in number, the tangency being of the order of enveloping circles with the latter of different radii. However, with the worm having the appearance of the hour glass—the point of least diameter intermediate the ends of the thread zone— the assembly of worm and gear is less flexible in application due to the fact that the line of axis is practically limited to a constant position for normal operation, even though the worm and wheel be generated on the fundamentals of the differential form, so that, in action, the assembly would then act as though the generation were on the basis of the simple type of gearing, although capable of being used with the differential conditions herein pointed out; the substitution of a worm of different number of threads would then be limited to the conditions of the simple form heretofore pointed out, since the substitution would then involve the characteristics of a change in center distances, unless special provision be made, and even under such conditions the structure would change the character of contact to such an extent as to make the structure more or less inefficient through the change in character of contact, it being assumed that the substitution is that of a worm of the hour-glass shape for one of similar shape.

However, if the substitution be of that of a worm having the shape shown in the drawings—practically half of the hour glass shape, the assembly can then take on the characteristics of the differential type, since the line of axis and point of tangency can then be shifted to a desired position and at the same time maintain center-distance relationship, and at the same time permit of the multiple worm possibilities above pointed out. From this it can be seen that with the worm and wheel generation based on the differential ratio condition that forms the foundation of the present invention, the assembly can operate with the use of either the hourglass form of worm or the semi-hour glass form shown, the flexibility possibilities differing with the two forms, but permitting substitution of one form for the other to meet individual conditions of service.

The ability to control the length of the action zone in this way enables the shortening of the length of the thread zone, even to an extent such as would permit, for instance, the location of two and possibly three separate worms differing as to number of threads, and therefore as to speed ratio, on the side of the vertical radius of the wheel. Such an arrangement is more or less of an illustration of flexibility of type and would be utilized only in case of a desire for the variation in speed ratios indicated above, the remaining worms, in such case, being located on the opposite side of such vertical radius; ordinarily, the dual speed condition is utilized, in which case the two worms would be located on opposite sides of the vertical radius. In each case the line of action axis would be located within the length of the thread zone of the worm which is being considered, so that each worm has its individual line of action axis or radius 10.

It will be noted, of course, that shifting the point of tangency from position to another to render different worms active with respect to a worm wheel common to all of them does not affect the operation. Such action is similar to that which takes place in the spur and annular gear differential assembly where the point of tangency is transferred from point to point as the assembly operates—in the present type, each of the worms, in co-operation with the worm wheel, has the action of an individual differential assembly, and simply represents one of the positions of the gears of the differential assembly.

Generally, the type has its active helical angles not greater than 45°, so that the direction of drive through the assembly is reversible. Larger helical angles could be employed to meet abnormal conditions, but in such instances, the point of tangency is located close to or at the larger end of the worm, thus reducing the length of the action zone, tending to set up the conditions of a special worm.

The tooth pitch characteristics are determined generally by the similar characteristics of the differential assembly on which it is based, and since the same differential assembly is utilized for each of the worms which may be employed with the common worm-wheel, it can be understood that these characteristics remain constant in the development of the worms for the wheel regardless of the number of threads the worm may employ.

From the above it will be understood that assemblies of the present type differ generally from the straight worm type in that the worm of the present type is of tooth enveloping characteristic, the degree of envelopment approaching the completeness of the hour-glass type, since the angle of tangency within the action zone of the worm is very small, due to the fact that the tangency is one of enveloping circles and not that of a straight line and a circle. On the other hand, the type differs from the hour-glass type in the presence of the tangency relation as distinguished from the coincidence relation of the hour glass type, so that while the tangency is very small in the vicinity of the point of tangency—insufficient to destroy the envelopment characteristics—and is absent at the point of tangency, the presence of the tangency relation as between the thread pitch line of the worm and the tooth pitch line of the wheel permits of the flexibility of application of the type pointed out to some extent above and which is absent from the hour glass type.

And, as pointed out in the above description, a fundamental characteristic in the type is the presence of a point of tangency of the tooth pitch circle of the worm wheel and the thread pitch line of the worm, with the point of tangency located within the limits of the thread zone of the worm and preferably intermediate the ends of the thread zone so that the vicinity of the point of tangency will present the small angle of tangency such as will permit of the presence of an action zone of sufficient length to provide concurrent action of a plurality of teeth in the drive action, and yet permit of the presence of the differential ratio relation such as will enable the substitution of worms developing different speed ratios while preserving center distance relation of the worm and wheel, or the use of two or more worms differing in speed ratio with a common worm wheel.

Since the worm and worm wheel assembly is designed to produce the characteristics of a differential ratio relation with the differential action exemplified by the internal gear differential assembly type, the present type assembly should present characteristics presented in the differential action of the differential assembly. In such differential assembly the characteristic feature lies in the fact that the axis of the spur gear revolves about the axis of the annular gear while rotating on its own axis, and while the circular rotates about its own axis, with the result that as the spur gear advances tooth by tooth, the point of tangency of the tooth pitch circles, advances correspondingly, with the result that the line of action axis of the spur gear remains constant relative to the point of tangency and the axis of the spur gear, since it travels with the gear as the latter has its characteristic movements in providing the differential action. Obviously, the tangential relation of the enveloping circles produced by the tooth pitch lines remains constant as to angle in the vicinity of the point of tangency as the spur gear advances, so that all times during the operation of the differential assembly, the general relation of the co-operating teeth in the point of tangency zone is similar, with the variations provided by the fact that as the point of tangency advances on the tooth pitch circles, different portions of the engaged teeth become active as containing the point of tangency.

In the present type assembly, as disclosed, the same characteristic feature is provided by changing the traveling action zone of the differential assembly to a stationary zone, by substituting the advancing action provided by the worm threads for the revolving motion of the spur gear in the differential assembly, the rotation of the worm wheel on its axis corresponding to the rotation of the spur gear of the differential assembly on its own axis.

Hence, by reproducing the tangency relation of the tooth pitch circles of the differential action through the tooth pitch circle of the worm wheel and the segment of the tooth pitch circle of the annular gear presented through the thread pitch line of the worm of the segment assembly, and then rotating the worm on its own axis, the differential action of the differential assembly is reproduced in the present type assembly although the point of tangency remains in stationary location.

This tangency characteristic of the present type is provided during the generation of the worm and worm wheel, and may be produced by either of several methods, not specifically disclosed herein, as they are presented in companion applications. These methods, however, present, directly or indirectly by equivalent action, the characteristic that is found in the differential assembly, in that the generating structure involves the movement of two parts arranged to provide the enveloping circle condition arranged to set up the point of tangency and angle of tangency relations of the differential assembly—as by the revolution of the enveloped element about the axis of the enveloping member while the latter rotates on its own axis while the former member rotates on its own axis or by retaining the position of the axis of the enveloped member stationary and rotating the enveloping member on its own axis—or by methods which produce equivalent result by other methods, the result accruing by generating the worm wheel or the worm, or both, be the enveloping circle assembly referred to, forming a standard to test the correctness of the tangency relations produced by other methods.

With the particular activities described as producing the standard result, the effect upon the form of the worm wheel teeth, for instance, is to provide the tooth characteristic of a helical angle contour which is involute relative to the mid-plane of the wheel, viz: the contour is involute from the mid-plane outwardly in both directions, with the involutes tangent at the mid-plane of the wheel. Since the profile is also of involute type, both profile and contour are involute in form. Such arrangement ensures a proper operation of the worm and worm wheel irrespective of the particular position of the point of tangency within the limits of the pitch-related thread zone of the worm.

The type thus presents the advantages of both the straight worm and the hour-glass worm assemblies, while eliminating the features of each which presents a use of one type in the sphere of action of the other type. In addition, the present type permits of flexibility characteristics such as are not found in either of the older types, as well as presenting structural advantages not found in either of the older types.

While I have herein shown and described the structure and characteristics of the present invention generally, and have pointed out several ways in which it may be utilized within the teachings of the disclosure, it will be understood that changes and modifications therein may be found desirable or essential in meeting the various exigencies of use to which the invention may be applied, and I desire to be understood as reserving the right to make any and all such changes or modifications therein as may prove desirable or essential in this respect insofar as the same may fall within the spirit and scope of the invention as expressed in the accompanying claims when broadly construed.

Having thus described my invention, what I claim as new is:—

1. In the production of worm and worm wheel assemblies to provide a differential ratio relation therebetween, the method which consists in creating a tangency relation between the worm and worm wheel of the order of enveloping circles by establishing within the limits of the thread zone of the worm a point of tangency of the thread pitch line of the worm and the tooth pitch circle of the wheel, developing angles of tangency of such pitch line and pitch circle to conform to the similar angles of the pitch circles respectively of the annular gear and spur gear of an internal gear differential assembly having the desired differential ratio relation, and developing the differential ratio relation between worm and worm wheel by producing the characteristics of the differential relative movements of such spur and annular gears during generation of a member of the assembly.

2. A method as in claim 1 characterized in that the point of tangency is located intermediate and spaced from the end limits of the thread zone of the worm.

3. A method as in claim 1 characterized in that the member generated is the worm wheel.

4. A method as in claim 1 characterized in that the member generated is the worm.

5. A method as in claim 1 characterized in that the pitch characteristics of the worm wheel teeth include profiles and contours of the helical angle involute in form.

6. A method as in claim 1 characterized in that the pitch characteristics of the worm wheel teeth include profiles and contours of the helical angle involute in form, and with the profiles and helical angle of the worm threads of involute form.

7. In the production of worm and worm wheel assemblies to provide a differential ratio relation therebetween in the drive relation between worm and wheel when either of a plurality of worms differing in speed ratio characteristics is individually or collectively active with the worm wheel of the assembly in drive relation between worm and worm wheel, the method which consists in creating a tangency relation between a worm and the worm wheel of the order of enveloping circles by establishing within the limits of the thread zone of the worm a point of tangency of the tooth pitch circle of the worm wheel and the thread pitch line of the several worms individually, developing angles of tangency of such tooth pitch circle and the thread pitch line relative to the point of tangency for each worm individually with such pitch circle and pitch lines conforming to the similar angles of the pitch circles respectively of the spur gear and annular gear of an internal gear differential assembly having the desired differential ratio relation, and developing the differential ratio relation between the respective worms and the wheel by producing the characteristics of the differential relative movements of such spur and annular gears when generating a member of the assembly.

8. A method as in claim 7 characterized in that the point of tangency location for one worm differs from that of the point of tangency of another worm of different speed ratio characteristics relative to a vertical radius of the worm wheel common to the several points of tangency is applied to the wheel.

9. A method as in claim 7 characterized in that the point of tangency for one of the worm and wheel assemblies is shifted relative to a vertical radius of the wheel when an assembly of the wheel with a worm of different speed ratio is rendered active with the wheel for service under conditions where the helical angle at the point of tangency of the assembly is the same with either worm as active in the assembly.

10. A worm and worm wheel assembly having the worm thread formation and worm wheel tooth formation co-operative in a differential ratio relation.

11. A worm and worm wheel assembly comprising a worm having its thread formation conforming to characteristics of a tooth segment of the annular gear of an internal gear differential assembly, and a worm wheel having its mid-plane section conforming to characteristics of the spur gear of such differential assembly, whereby the worm and worm wheel will co-operate with a differential ratio relation when assembled.

12. A worm and worm gear assembly comprising a worm and worm wheel assembled with the thread pitch line of the worm and the tooth pitch circle of the wheel related tangentially on the order of enveloping circles and with a point of tangency of the pitch line and pitch circle located within the end limits of the thread zone of the worm.

13. A worm and worm gear assembly comprising a worm and worm wheel assembled with the thread pitch line of the worm and the tooth pitch circle of the wheel related tangentially on the order of enveloping circles and with a point of tangency of the pitch line and pitch circles located within the end limits of the thread zone of the worm, said worm on its pitch line presenting the characteristics of the pitch circle of the annular gear of an internal gear differential assembly, said worm wheel on the pitch circle of its mid-plane section presenting the characteristics of the spur gear of such differential assembly, whereby the worm and worm wheel assembly will provide a differential ratio relation between its members.

14. An assembly as in claim 13 characterized in that the pitch characteristics of the worm and worm wheel on a mid-plane section of the wheel extending through the axis of the worm conform to the pitch characteristics of the annular and spur gears of the differential assembly.

15. An assembly as in claim 12 characterized in that the profile and contours of the teeth of the worm wheel are of involute form.

16. An assembly as in claim 12 characterized in that the profile and helical angle of the worm threads is of involute form.

17. An assembly as in claim 12 characterized in that the profile and contours of the teeth of the worm wheel are of involute form, with the profile and helical angle of the threads of the worm of involute form.

18. An assembly as in claim 12 characterized in that the profile and contours of the teeth of the worm wheel are of involute form, the helical contour of a tooth being involute outwardly in opposite directions from the mid-plane of the wheel.

19. In combination, a worm wheel and a plurality of worms differing in speed ratio relative to the worm wheel and each worm and the worm wheel being adapted to provide a drive relation between worm and worm wheel when the worms are assembled actively with the wheel individually or collectively, the assembly presenting the worm thread formation and worm wheel tooth formation as co-operative in a differential ratio relation.

20. In combination, a worm wheel and a plurality of worms differing in speed ratio relative to the worm wheel, each worm and the worm wheel being adapted to provide a drive relation between worm and worm wheel when the worms are assembled actively with the wheel individually or collectively, the assembly presenting the worm thread formation and worm wheel tooth formation as co-operative in a differential ratio relation, the worm wheel and a worm being assembled to provide a tangential relation therebetween of the order of enveloping circles, with a point of tangency of the worm thread pitch line and the wheel tooth pitch circle located within the end limits of the thread zone of the worm.

21. A worm having its thread zone formation adapted to substantially envelop a segment of the tooth zone of the worm wheel with which it is co-operative, with the thread pitch line of the worm in tangential relation to the tooth pitch circle of the worm wheel, the tangency relation being of the order of enveloping circles.

22. A worm and worm wheel assembly comprising a plurality of worms arranged in axial alinement and each meshing with a worm wheel common to the worms, the pitch circles of the worms having a tangent relation to the pitch circle of the worm wheel with the points of tangency of the pitch circles of the several worms each individual to the worm, said worms differing relatively to each other in the number of threads presented by a cross-section of the respective worms, said worms being mounted in the assembly to restrict active driving relation between the wheel and a selected worm of the tooth-and-thread engaged worms with the remaining worm or worms engaged but operating idly.

23. An assembly as in claim 22 characterized in that the helical angle of the threads of the respective worms is of similar value at the points of tangency.

24. A worm wheel assembly comprising a plurality of driving worms arranged in axial alinement and meshing with a single worm wheel, means whereby either of said worms may drive said wheel while the other worm is idling, the threads on each worm being of the same chordal thickness, profile and depth on a thread cross-section and having the same pitch circle relation on the mid-plane sections of the worm, the cross-section of one of said worms having more threads than any cross-sectional portion of the other of said worms, and the said worm wheel being provided with teeth contoured to simultaneously mesh with the teeth of both worms with a rolling-sliding action, whereby one of said worms may drive said wheel at a higher speed than the other.

FRANK V. ELBERTZ.